US012188434B2

(12) United States Patent
Vaditya et al.

(10) Patent No.: US 12,188,434 B2
(45) Date of Patent: Jan. 7, 2025

(54) ZERO EMISSION SUPERSONIC FAN ENGINE

(71) Applicants: Pramod Vaditya, Hyderabad (IN); Anil Kumar Kommagalla Veldi, Karimnagar (IN); Abhijeet Inamdar, Houston, TX (US); Lars-Erik Robertsen, Tennfjord (NO); SiriNoR AS, Tennfjord (NO)

(72) Inventors: Pramod Vaditya, Hyderabad (IN); Anil Kumar Kommagalla Veldi, Karimnagar (IN); Abhijeet Inamdar, Houston, TX (US); Lars-Erik Robertsen, Tennfjord (NO)

(73) Assignee: SiriNor AS, Stavanger (NO)

( * ) Notice: Subject to any disclaimer, the term of this patent is extended or adjusted under 35 U.S.C. 154(b) by 0 days.

(21) Appl. No.: 18/689,354

(22) PCT Filed: Aug. 31, 2022

(86) PCT No.: PCT/US2022/042209
§ 371 (c)(1),
(2) Date: Mar. 5, 2024

(87) PCT Pub. No.: WO2023/059410
PCT Pub. Date: Apr. 13, 2023

(65) Prior Publication Data
US 2024/0271589 A1 Aug. 15, 2024

(30) Foreign Application Priority Data
Sep. 6, 2021 (IN) .............................. 202141040401

(51) Int. Cl.
*F02C 7/04* (2006.01)
*F02K 7/00* (2006.01)
(Continued)

(52) U.S. Cl.
CPC .................. *F02K 7/00* (2013.01); *F02K 9/97* (2013.01); *B64D 2033/026* (2013.01); *F02C 7/04* (2013.01); *F05D 2220/70* (2013.01)

(58) Field of Classification Search
CPC .. F02C 7/04; F02C 7/042; F02C 7/103; F02C 3/08; B64D 33/02
See application file for complete search history.

(56) References Cited

U.S. PATENT DOCUMENTS 4,137,708 A 2/1979 Aspinwall et al.
4,519,208 A 5/1985 Loisy et al.
(Continued)

FOREIGN PATENT DOCUMENTS

EP 2516269 B1 10/2012
EP 3137376 B1 3/2017
(Continued)

OTHER PUBLICATIONS

International Search Report and Written Opinion mailed Jun. 28, 2023, in PCT/US2022/042209, 18 pgs.

*Primary Examiner* — Gerald L Sung
(74) *Attorney, Agent, or Firm* — Polsinelli PC

(57) ABSTRACT

Supersonic jet engine includes a housing and an exhaust nozzle. Spike extends outwardly from the housing. Plurality of fans are arranged in an axial direction within the housing, each of the plurality of fans includes a plurality of fan blades. Plurality of turbines are included, and each of the plurality of turbines having a plurality of turbine blades and being arranged and coupled to a respective one of the fans in a radial direction. Plurality of radial compressors are located radially from the each of the plurality of turbines and are operable to drivingly rotate the respective turbine, which in turn rotates the respective fan. Plurality of electric motors are included, and each of the plurality of electric motors are (Continued)

coupled to a respective one of the plurality of radial compressors and drivingly rotating the respective radial compressor.

17 Claims, 6 Drawing Sheets

(51) Int. Cl.
   *F02K 9/97* (2006.01)
   *B64D 33/02* (2006.01)

(56) References Cited

U.S. PATENT DOCUMENTS

| | | |
|---|---|---|
| 4,928,286 A | 5/1990 | Grumman |
| 5,106,035 A | 4/1992 | Langford, III |
| 6,499,286 B1 | 12/2002 | Zakharov et al. |
| 6,550,717 B2 | 4/2003 | MacCready et al. |
| 8,365,510 B2 | 2/2013 | Lugg |
| 11,312,501 B1 | 4/2022 | Ress, Jr. et al. |
| 2003/0230671 A1 | 12/2003 | Dunn |
| 2004/0245382 A1 | 12/2004 | Nozaki |
| 2005/0138914 A1* | 6/2005 | Paul .................... F02K 9/78 60/226.1 |
| 2009/0145102 A1* | 6/2009 | Roberge ................ F02C 3/067 415/68 |
| 2014/0151495 A1 | 6/2014 | Kuhn |
| 2015/0017557 A1 | 1/2015 | Hoffjann et al. |
| 2019/0338664 A1 | 11/2019 | Kozhevnikov |
| 2020/0290742 A1 | 9/2020 | Kumar et al. |
| 2020/0355117 A1* | 11/2020 | Miftakhov ......... H01M 8/04111 |
| 2022/0009379 A1 | 1/2022 | Mikic et al. |

FOREIGN PATENT DOCUMENTS

| | | |
|---|---|---|
| EP | 3885267 A1 | 9/2021 |
| EP | 3985241 A1 | 4/2022 |
| WO | 1998014367 A2 | 4/1998 |
| WO | 2015181512 A1 | 12/2015 |
| WO | 2021257567 A1 | 12/2021 |
| WO | 2022013459 A1 | 1/2022 |

* cited by examiner

ZERO EMISSION SUPERSONIC FAN ENGINE

CROSS REFERENCE TO RELATED APPLICATIONS

The present application claims the benefit to and priority from Indian Provisional Patent Application No. 202141040401, filed Sep. 6, 2021, the entire contents of which are hereby incorporated by reference in their entirety.

FIELD

The present disclosure generally relates to an apparatus and method for flying at speed faster than the speeds of sound while generating no emissions during flight.

BACKGROUND

Numerous attempts are being made to produce zero emission flying vehicle that operate at subsonic speeds. Furthermore, numerous attempts are being made to operate flying vehicle at speeds faster than the speed of sound.

BRIEF DESCRIPTION OF THE DRAWINGS

Implementations of the present technology will now be described, by way of example only, with reference to the attached figures, wherein.

DETAILED DESCRIPTION

Figure 1:
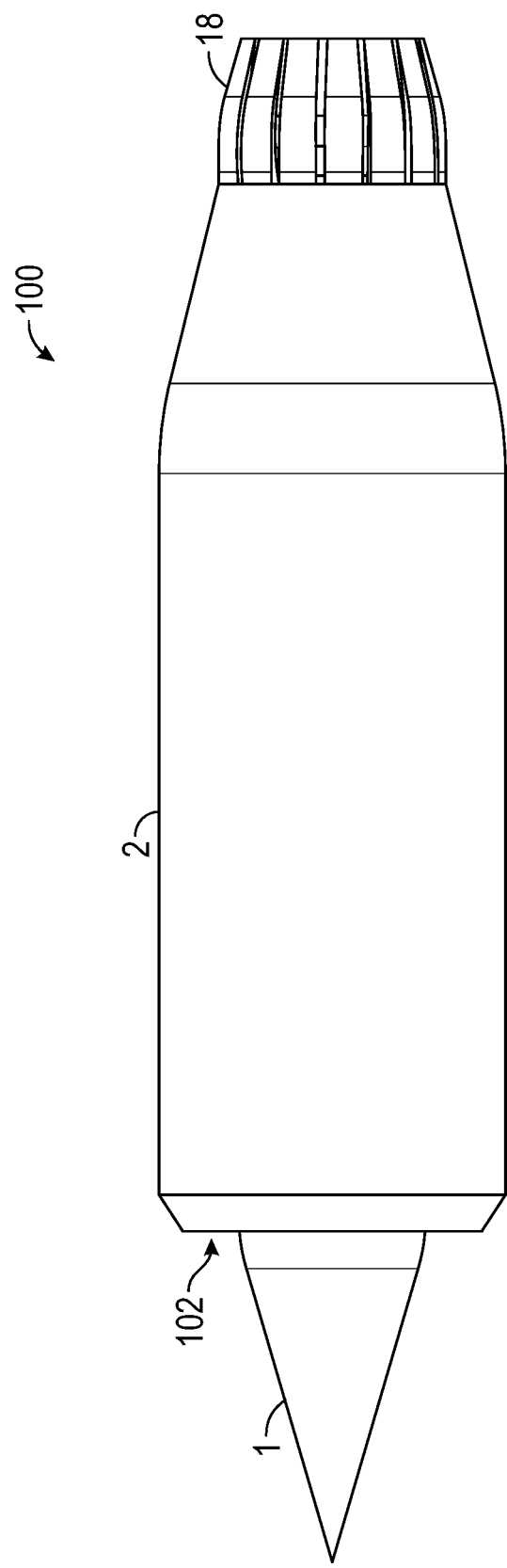
FIG. 1 is a side view and diagrammatic example of an electric engine of a flying vehicle having speeds faster than the speed of sound according to at least one instance of the present disclosure.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

The present disclosure generally relates to a zero emission engine designed for flying vehicle having speeds faster than the speed of sound. The present disclosure is also operable at subsonic speeds, but the engine is designed to operate at supersonic speeds. One of the differences between the present disclosure and conventional engines is the operation for flying at supersonic speeds. Another difference between the present disclosure and conventional engines is the source of power. In at least one example, the presently disclosed engine can be operable to run on compressed air. As detailed below, the compressed air can be generated from electric powered compressors. The presently disclosed engine can implement at least one turbine coupled to a respective fan in combination with the compressed air or separately therefrom. The at least one turbine can be mechanically coupled to the respective fan such that the at least one turbine and respective fan rotate in opposite directions. In at least one example, they can be coupled through a planetary gear mechanism or other counter rotating mechanisms that allow the turbine to rotate the respective fan. In at least one example, the engine is designed to produce speeds faster than the speed of sound without combustion and without emitting any pollutants.

In at least one example, the fan, which is producing thrust, can be include a series of blades within circular casing and physically joined to the turbine blades around the casing.

The turbine can operate based upon reaction force produced by the compressed air that is produced on board using radial compressors. The radial compressors can be centrifugal compressors. The present disclosure, in at least one example, uses a contra rotating tip powered turbine for high-velocity thrust. In at least one example, the present disclosure utilizes a solid fan blade that does not include any hollowed portions. Additionally, the present disclosure can include high reaction turbine blades that are also solid without any hollow portion. The compressed air can drive the turbine by the expansion of the compressed air. The compressed air can be produced by a centrifugal compressor, which is powered electrically.

As described above, the present technology can emit zero pollutants. Additionally, the present technology can have one or more of the following advantages: less heat being added into the atmosphere as compared to conventional technology, reduced complexity in operation of the engine as compared to conventional technology, and/or reducing the risk factor of explosion and fire hazards as compared to conventional technology.

FIG. 1 is a side view and diagrammatic example of an electric engine 100 of a flying vehicle, such as a jet airplane, capable of flying at speeds faster than the speed of sound according to at least one instance of the present disclosure. The engine 100 includes a housing 2, a spike 1, and an exhaust nozzle 18. The spike 1 can be conical shaped as illustrated. Additionally, the spike 1 can be moveable. In one example, the spike 1 is movable in an axial direction. Having a moveable spike 1 allows the engine 100 to be modified during operation for subsonic and supersonic travel. A cone shaped movable spike 1 can modify the air intake and adjust the shockwaves position to ensure that the air coming into the primary duct or inlet 102 is subsonic even when the engine 100 is operating at supersonic speeds.

Figure 2:
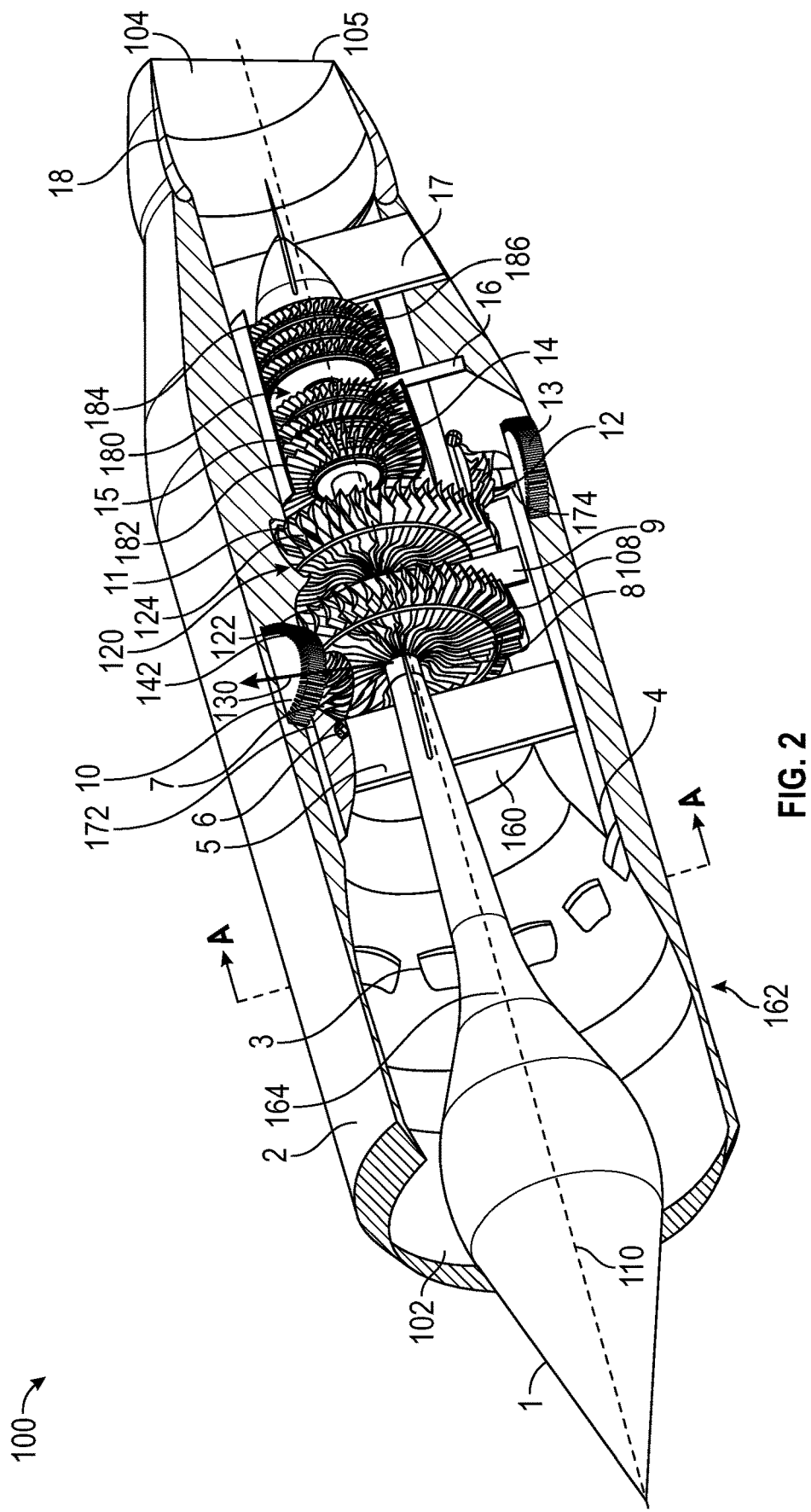
FIG. 2 is a sectional view of FIG. 1, according to at least one instance of the present disclosure.

FIG. 2 is a sectional view of FIG. 1, according to at least one instance of the present disclosure. The engine 100 can start by powering electric motors 10, 13 that are coupled to a respective one of the radial compressors 7, 12. In at least one example, the electric motors 10, 13 can be coupled to the respective one of the radial compressors 7, 12 by a shaft 19, see FIG. 6. In other examples, the electric motors 10, 13 can be directly connected to the respective one of the radial compressors 7, 12. The electric motors 10, 13 can powered electrically from an onboard source of electricity such as a fuel cell or battery as will be explained in regards to FIG. 7 below. The radial compressors 7, 12 can act as the engine control unit. The radial compressors 7, 12 act as an engine control unit by adjust the flow of air to the respective one of the plurality of turbines 120. The radial compressors 7, 12 are equipped with Guided Flow Channels (GFC) 4 for air intake. In at least one example, there can be a plurality of radial compressors 140, and each of the plurality of radial compressors 140 can have a corresponding one of GFC 4. The respective one of the plurality of radial compressors 7 is located at an exit end 172 of the secondary flow channel 4 and air flows from the secondary flow channel 4 through the respective one of the radial compressor 7 and then to a respective one of the plurality of turbines 122. The respective one of the plurality of radial compressors 12 is located at an exit end 174 of the secondary flow channel 4 and air flows from the secondary flow channel 4 through the respective one of the radial compressor 12 and then to a respective one of the plurality of turbines 124.

The intake air is modified using one or more ramp doors 3 which can be aerodynamic surfaces. The one or more ramp doors 3 controls the area of the intake area 150 for the GFCs 4, see FIG. 3A. The area of intake area 150 allows for control over the amount of air that is taken through the GFC 4 and in turn the amount of air that is compressed by the respective one of the plurality of radial compressors 140. The plurality radial compressors 140 can be superior to axial compressors in producing high-pressure per single stage and occupy less volume to deliver the same amount of pressure. As illustrated, a series of radial compressors 7, 12 can be arranged around the circumference of the secondary flow channel 4. The secondary flow channel 4 can be a single flow channel or be made of a plurality of flow channels. Additionally, in at least one instance, a first secondary flow channel 4 can be directed to a first set 142 of radial compressors 140 and a second secondary flow channel 4 can be directed to a second set 144 of radial compressors 140. The Guided Flow Channels (GFC) can be formed in the housing 2 and create a dedicated separate air intake for each radial compressor 7, 12.

In the illustrated example, the plurality of fans 108 can be two fans, namely a primary fan and a secondary fan that can be contra-rotating as compared to the primary fan. Contra-rotating refers to rotating in a direction that is opposite the other direction. For example, the primary fan can rotate clockwise and the secondary fan can rotate counter-clockwise. In at least one example, the primary fan is located closer to the spike as compared to the secondary fan. A plurality of stationary vanes can be located between the first fan and the second fan.

A contra rotating two spool axial compressor 14 is placed behind the contra rotating fan to increase the pressure of the mass flow. A planetary gearbox (not shown) can be implemented to ensure sufficient rotational velocity of the compressors. The primary fans spindle 164 is connected to the first spool 182 of the compressor 180 and the second fans spindle is connected to the second spool 184 of the compressor 180 through the concentric shaft. The axial compressor is covered with a stator casing 15. The high pressure compressed air expands through exhaust nozzle 18 creating a supersonic thrust. The engine 100 can also be operable at subsonic speeds, but the primary configuration and operation are designed for supersonic thrust.

The exhaust air can pass through the exhaust nozzle 18, which in the illustrated example can be a variable convergent divergent nozzle. The exit air velocity is faster than speed of sound, for example in the range of 1 Mach to 10 Mach. The whole system is axially arranged and strengthened by stationary structures or vanes 5, 9, 16, 17.

The above description provides for how the flow of air operates through the engine. Some additional details are given with respect to FIG. 6 below as well. Further details on the supersonic jet engine 100 are provided herein as well. The supersonic jet engine 100 includes a housing 2 having an inlet 102 and an exhaust nozzle 18. As described above, air enters the engine 100 through the inlet 102 and exits the engine 100 at the exhaust nozzle 18. The exhaust nozzle 18 is variable allowing the exhaust nozzle 18 to adjust the size of an opening 105 formed at an exit 104 of the exhaust nozzle 18.

The jet engine includes a spike 1 extending outwardly from the inlet 102. As detailed above, the spike 1 can be of a conical shape and/or movable. The engine 100 includes a plurality of fans 108 arranged in an axial direction 110 within the housing 2. Each of the plurality of fans 108 includes a plurality of fan blades 8. The fan blades 8 can be shaped as described in relation to FIG. 4 below. In at least one example, the fan blades 8 can be carbon fiber and with titanium leading edge fan blades. In other examples, different types of fan blades can be implemented as well. A plurality of stationary vanes 9 can be located between the first fan and the second fan.

The engine 100 includes a plurality of turbines 120. Each of the plurality of turbines 120 have a plurality of turbine blades 11. Each of the plurality of turbines 120 can be arranged and coupled to a respective one of the plurality of fans 108 in a radial direction 130.

The engine 100 a plurality of radial compressors 7, 12 located radially from the each of the plurality of turbines 120. Each of the plurality of radial compressors 7, 12 are operable to drivingly rotate the respective turbine 120, which in turn rotates the respective fan 108. The plurality of turbines 120 can include a first turbine 122 and a second turbine 124. The plurality of radial compressors 7, 12 comprises a first set of radial compressors 7 and a second set of radial compressors 12, wherein the first set of radial compressors 7 are operable to rotate the first turbine 122 and the second set of radial compressors 12 are operable to rotate the second turbine 124. The first set of radial compressors 7 are located in a forward axial direction 110 compared to the first turbine 124 and the second set of radial compressors 12 are located aft axial direction 110 compared to the second turbine 124. The first turbine 122 can rotate in a first direction and the second turbine 124 rotates in a second direction that is contra to the first direction.

The engine 100 includes a plurality of electric motors 10, 13. Each of the plurality of electric motors 10, 13 can be coupled to a respective one of the plurality of radial compressors 7, 12 and drivingly rotating the respective radial compressor 7, 12. The engine 100 can include a first set of stationary vanes 5 that span from an interior 160 of the housing 2 to support the main shaft 164. In at least one example, the first set of stationary vanes 5 can span from the interior 160 to an exterior 162 of the housing 2, but not penetrate the exterior 162 of the housing 2.

The engine 100 can include one or more spools of axial compressors 180. In at least one example, the engine 100 can include a first spool 182 of axial compressors 180 and a second spool 184 of axial compressors 180. In at least one example, the first spool 182 of axial compressors 180 includes a plurality of axial compressor stages 186 and the second spool 184 of axial compressors 180 includes a plurality of axial compressor stages 186. The first spool 182 of axial compressors 180 and the second spool 184 of axial compressors 180 rotate in contra direction. A plurality of stationary vanes 16 located between the first spool 182 and the second spool 184. A plurality of stationary vanes 17 can located aft of the second spool 184 in an axial direction 110.

Figure 3B:
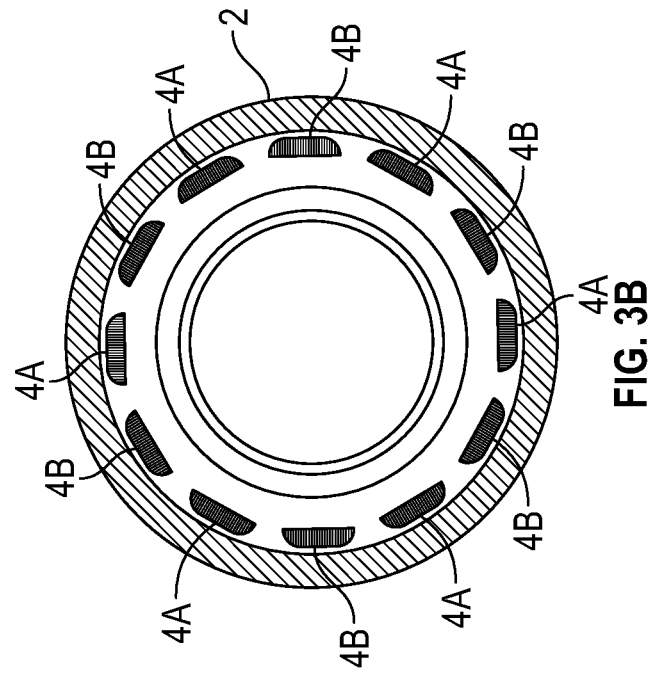
FIG. 3B is a sectional view of FIG. 1 along line A-A, according to at least one instance of the present disclosure.
Figure 3A:
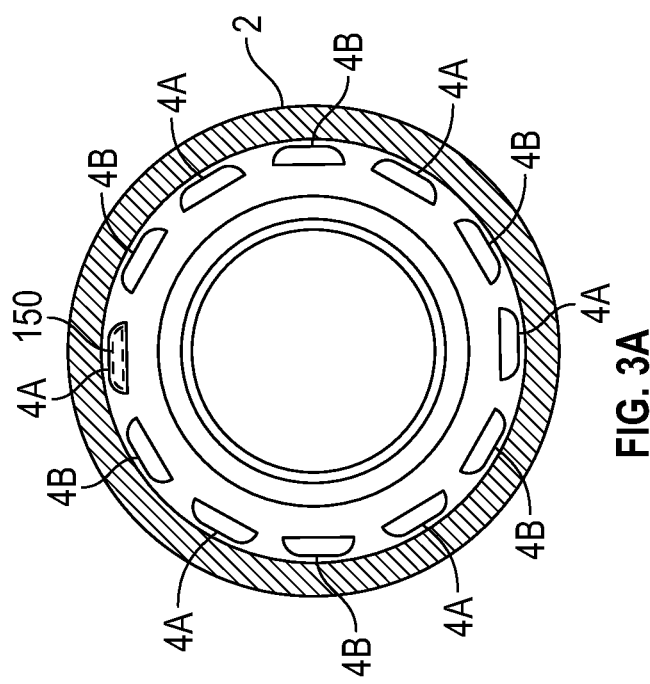
FIG. 3A is a front view of FIG. 1, according to at least one instance of the present disclosure.

FIG. 3A is a front view of FIG. 1, according to at least one instance of the present disclosure. FIG. 3B is a sectional view of FIG. 1 along line A-A, according to at least one instance of the present disclosure. The GFCs 4A are for the first stage fan, as shown the primary fan, and the GFCs 4B are for the secondary fan, as shown a contra-rotating fan. The housing 2 forms a plurality of ramp doors (see FIG. 2) and a plurality of secondary flow channels 4A, 4B, that extend from a respective one of the plurality of ramp doors to a respective one of the plurality of radial compressors (see FIG. 2). Each of the plurality of ramp doors are configurable to adjust an intake area 150 for the respective one of the secondary flow channels 4A, 4B. In at least one example, the one or more secondary flow channels 4A is operable to be coupled with one or more radial compressors associated with the first turbine 122. Additionally, the one or more secondary flow channels 4B is operable to be coupled with one or more radial compressors associated with the second turbine 124.

Figure 4:
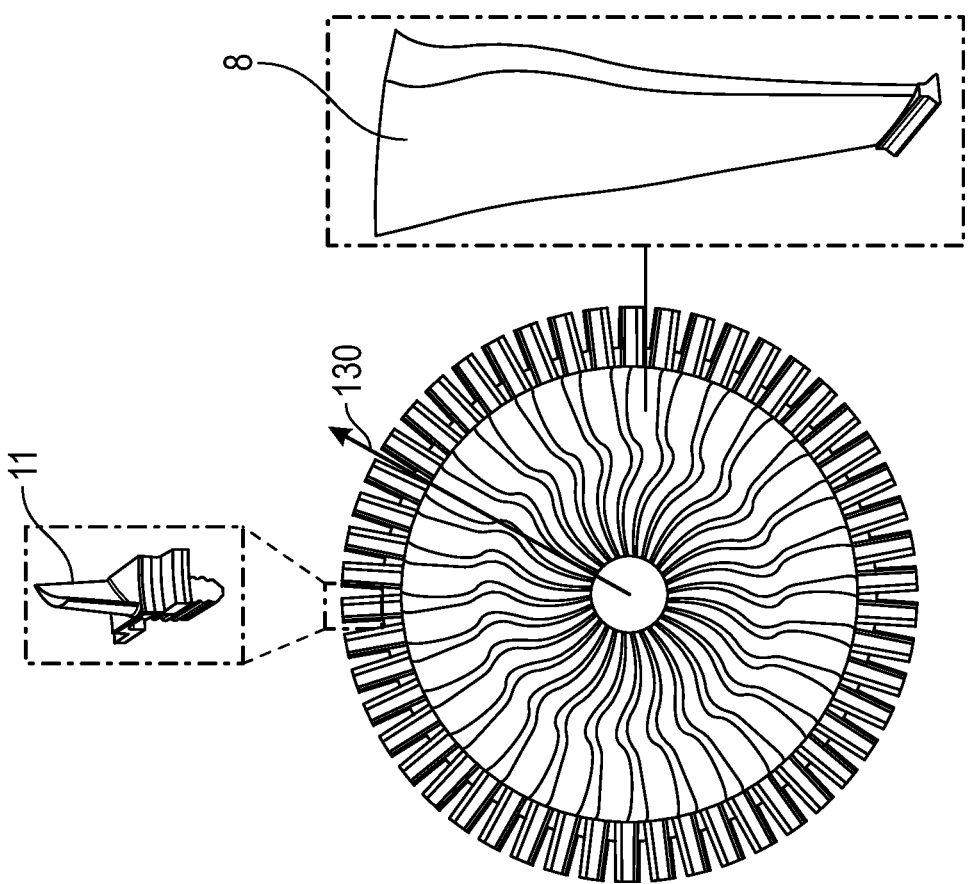
FIG. 4 is a detailed view of an example of a turbine and fan including exploded views of a turbine blade and fan blade, according to at least one instance of the present disclosure.

FIG. 4 is a detailed view of an example of a turbine 120 and fan 108 including exploded views of a turbine blade 11 and fan blade 8, according to at least one instance of the present disclosure. FIG. 4 is a detailed view of turbine 120, according to at least one instance of the present disclosure. The tip turbine 120 is very efficient compared to conventionally driving the fan 108 from the turbine 120 because there is no shaft, thus there is nothing lost as shaft work in the tip of the turbine 120. All necessary methods will be followed to reduce pneumatic losses in compressor and turbine by means of using cascades, seals and precise design. The noise suppression design and combustion elimination provide for about 60% reduction in noise compared to conventional high speed air vehicle engines.

Figure 5A:
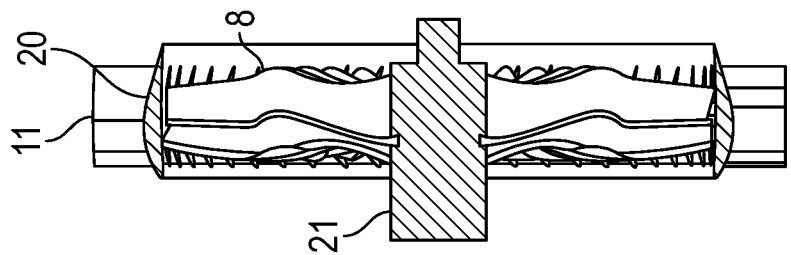
FIG. 5A is a side view of an example of a turbine, according to at least one instance of the present disclosure.

FIG. 5A is a side view of an example of a turbine 120, according to at least one instance of the present disclosure. The shroud casing 20 which is connecting turbine blades 11 and the fan blades 8 is an aerodynamic stiffener which helps to reduce the energy required to drive the fan 108 by creating additional inertial momentum at the tip, by following the principle of lever-arm effect, the force required to turn the fan 108 is reduced. The fan blade 8 is the new generation fan blade design which is a more efficient air driver manufactured using carbon fiber and titanium at leading edge. This acts as the fan 108 at the same time delivers mechanical power to the compressor.

Figure 5B:
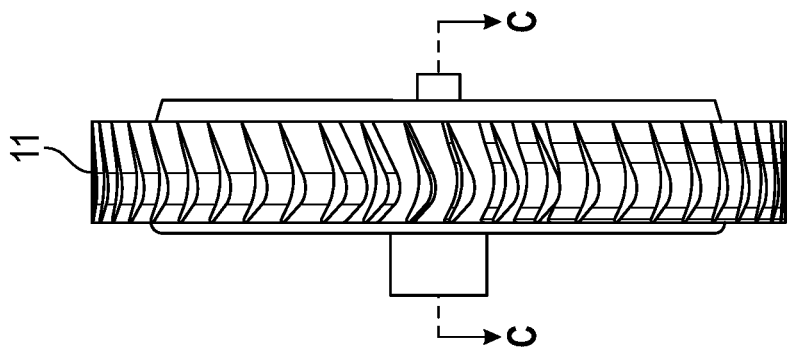
FIG. 5B is a cross sectional view of FIG. 5A, according to at least one instance of the present disclosure.

FIG. 5B is a cross sectional view of FIG. 5A, according to at least one instance of the present disclosure. Casing 20 shrouds the fan blades 8, the casing 20 provides stiffness to the fan, makes it structurally stable and provides more inertial momentum while rotating compared to conventional fan. To further accelerate the flow of air, the engine is equipped with counter-rotating fan that is placed just behind the primary fan.

Figure 6:
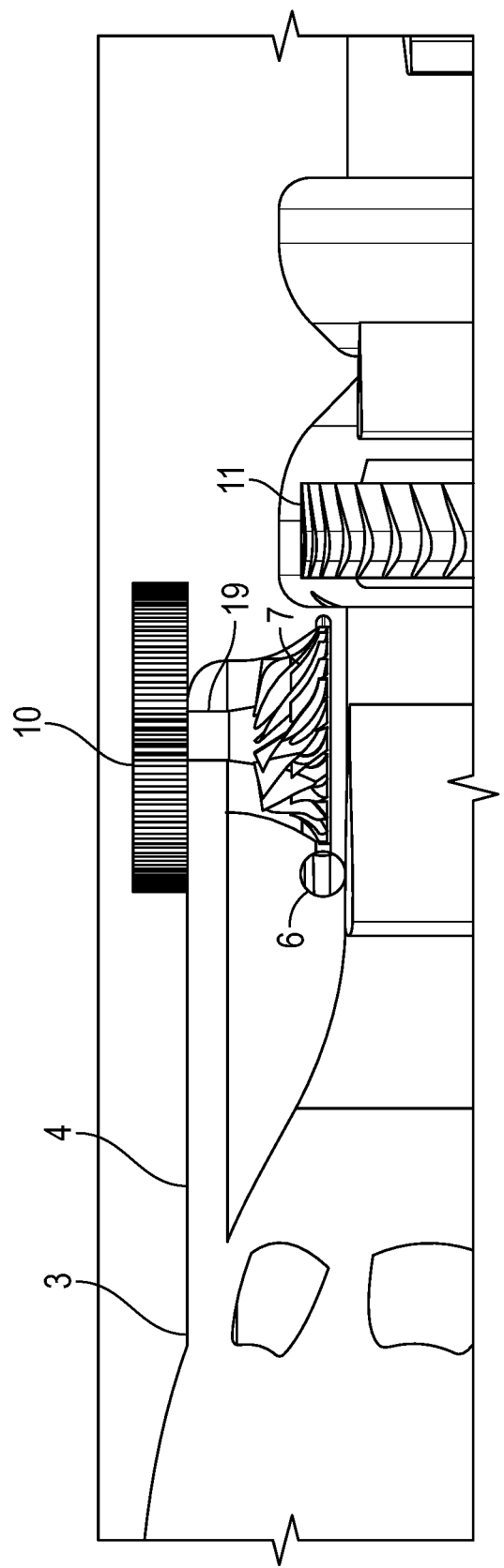
FIG. 6 is a diagrammatic view of a radial compressor and turbine, according to at least one instance of the present disclosure.

FIG. 6 is a diagrammatic view of a radial compressor and turbine, according to at least one instance of the present disclosure. The respective one of the plurality of radial compressors 7 is located at an exit end 172 of the secondary flow channel 4 and air flows from the secondary flow channel 4 through the respective one of the radial compressor 7 and then to a respective one of the plurality of turbines 11.

FIG. 6 is a detailed view of the secondary duct including a ramp 3, a GFC 4 for the first stage fan. The air is moved by a compressor 7 which is driven by an electric motor 10 through a shaft 19, that compressed air is then ejected on turbine 11 via an ejector nozzle connected to volute 6. The compressed air can then expand through ejector nozzle which is attached to the compressor volute 6 onto the turbine blades 11, which are aerodynamic and/or designed to produce high torque and rapid air expansion. The turbine blades 11 can be fixed around fan casing 20. The rotation of the turbine 11 created by the expansion of air results in speeds faster than speed of sound.

Figure 7:
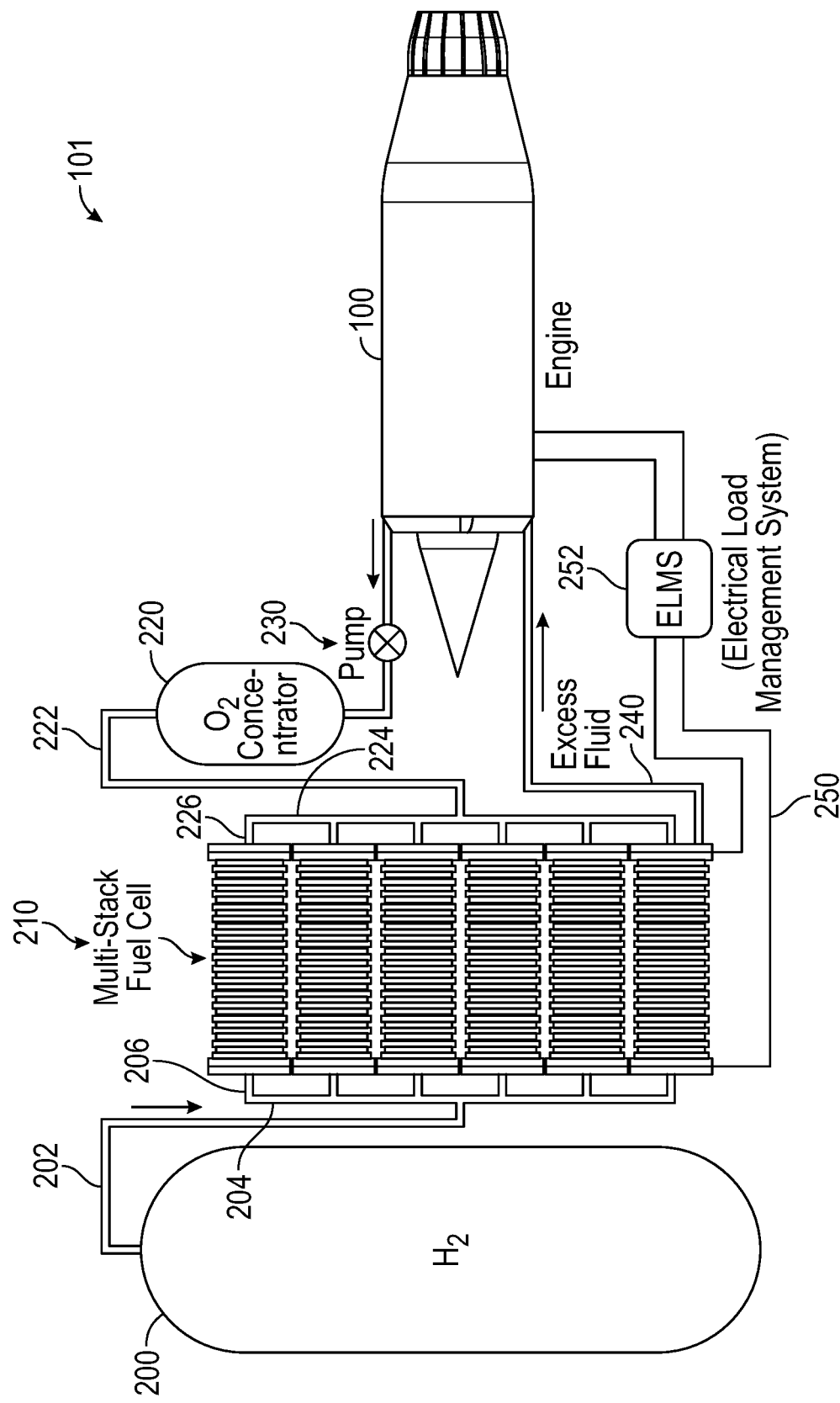
FIG. 7 is a diagrammatic representation of an example drivetrain, according to at least one instance of the present disclosure.

FIG. 7 is a diagrammatic representation of an example drivetrain, according to at least one instance of the present disclosure. As described above, the engine integration is a radially driven turbine with counter rotating fan, counter rotating compressor spools and variable exit nozzle. The fuel source of hydrogen is converted to electricity by the multi-stack fuel cell by also using oxygen that is concentrated prior to being sent by the engine compressor. The radial compressor has the advantage of producing high pressure in a single stage that can reduce the drag in front of the fan and make the engine cowl a slender design. The excess fluid coming out of the fuel cell system then can be sent to the radial compressor that can help to increase the density of the inlet fluid, which can increase the compressor and turbine efficiency.

The source of power is electrical power, for example produced onboard using hydrogen as a fuel. Other sources of electrical power are also considered within the scope of this application including but not limited to batteries, chemical sources, nuclear power, and/or capacitor type storage. The controlling unit of the above-mentioned engine is electrical resistance, compressor revolutions per minute (RPM) and the inlet fluid density. The engine could be also modified as combustion driven engine by introducing a combustion chamber between the radial compressor exit and turbine, even in this case the fuel can be hydrogen for combustion. This engine with certain modifications can also be used for subsonic flying vehicles using the same principle of pneumatically driven tip turbine engine system if the obtained power to weight ratio is greater than compared to conventional hub driven motor-propeller/fan engine The illustrated example provides a supersonic jet engine system 101 can include a source of hydrogen 200. In at least one example, the source of hydrogen 200 can be a compressed tank of hydrogen gas. The system 101 can include a multi-stack fuel cell 210 coupled to the source of hydrogen 200. In one example, the multi-stack fuel cell 210 can be coupled to the source of hydrogen though a gas line 202 that is coupled to a header 204 that has individual runs 206 for each fuel cell within the multi-stack fuel cell 210.

Additionally, an oxygen concentrator 220 can be coupled to the multi-stack fuel cell 210. In at least one example, the oxygen concentrator 220 can be coupled to the multi-stack fuel cell 210 through one or more gas lines 222. In at least one example, a header 224 is implemented that branches out into individual lines 226 to feed the respective one of the fuel cells within the multi-stack fuel cell 210.

The oxygen concentrator 220 can also be coupled to the engine 100. A pump 230 can further be located between the oxygen concentrator 220 and the engine 100. The pump 230 can apply positive pressure beyond what is available from the engine 100. Additionally, check valves and/or one way valves can be provided to prevent backflow. Excess fluid can be returned through a line 240 to the engine 100 for expulsion. In at least one example, the excess fluid is in the form of water and/or water vapor.

The system 101 can include an electrical load management system 252 coupled to the multi-stack fuel cell 210. The electrical load management system 252 can be coupled though one or more electrical lines 250 to the engine 100 and the multi-stack fuel cell 210.

The system 101 can include a supersonic jet engine 100 operable to receive electrical power from the electrical load management system 252, wherein the electrical power drives a plurality of electric motors that rotates a plurality of radial compressors of the supersonic jet engine and thereby rotate a plurality of fans within the supersonic jet engine 100. The supersonic jet engine 100 of the supersonic jet engine system can include one or more features of the engine 100 described herein.

While the above illustration is in regards to hydrogen based electrical power generation, other onboard electric sources could be implemented instead includes those described above.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

Illustrative examples of the disclosure include:

Aspect 1: A supersonic jet engine comprising: a housing having an inlet and an exhaust nozzle; a spike extending outwardly from the inlet; a plurality of fans arranged in an axial direction within the housing, wherein each of the plurality of fans includes a plurality of fan blades; a plurality of turbines, each of the plurality of turbines having a plurality of turbine blades and being arranged and coupled to a respective one of the fans in a radial direction; a plurality of radial compressors located radially from the each of the plurality of turbines and operable to drivingly rotate the respective turbine, which in turn rotates the respective fan; a plurality of electric motors, each of the plurality of electric motors coupled to a respective one of the plurality of radial compressors and drivingly rotating the respective radial compressor.

Aspect 2: The supersonic jet engine of Aspect 1, wherein the exhaust nozzle is variable allowing the exhaust nozzle to adjust a size of an opening formed at an exit of the exhaust nozzle.

Aspect 3: The supersonic jet engine of any one of Aspects 1 or 2, further comprising a first spool of axial compressor and a second spool of axial compressor.

Aspect 4: The supersonic jet engine of Aspect 3, wherein the first spool of axial compressor includes a plurality of axial compressor stages and the second spool of axial compressor includes a plurality of axial compressor stages.

Aspect 5: The supersonic jet engine of any one of Aspects 3-4, wherein the first spool of axial compressor and the second spool of axial compressor rotate in contra direction.

Aspect 6: The supersonic jet engine of any one of Aspects 3-5, further comprising a plurality of stationary vanes located between a first fan and a second fan of the plurality of fans.

Aspect 7: The supersonic jet engine of any one of Aspects 3-6, further comprising a plurality of stationary vanes located between the first spool and the second spool.

Aspect 8: The supersonic jet engine of any one of Aspects 3-7, further comprising a plurality of stationary vanes located aft of the second spool in an axial direction.

Aspect 9: The supersonic jet engine of any one of Aspects 1-8, wherein the housing forms a plurality of ramp doors and a plurality of secondary flow channels that extend from a respective one of the plurality of ramp doors to a respective one of the plurality of radial compressors.

Aspect 10: The supersonic jet engine of Aspect 9, wherein each of the plurality of ramp doors are configurable to adjust an intake area for the respective one of the secondary flow channels.

Aspect 11: The supersonic jet engine of any one of Aspects 9-10, further comprising a first set of stationary vanes that span from an interior of the housing to support a main shaft.

Aspect 12: The supersonic jet engine of any one of Aspects 9-10, wherein the respective one of the plurality of radial compressors is located at an exit end of the secondary flow channel and air flows from the secondary flow channel through the respective one of the radial compressors and then to a respective one of the plurality of turbines.

Aspect 13: The supersonic jet engine of Aspect 12, wherein the plurality of turbines includes a first turbine and a second turbine and the plurality of radial compressors comprises a first set of radial compressors and a second set of radial compressors, wherein the first set of radial compressors are operable to rotate the first turbine and the second set of radial compressors are operable to rotate the second turbine.

Aspect 14: The supersonic jet engine of Aspect 13, wherein the first set of radial compressors are located in a forward axial direction compared to the first turbine and the second set of radial compressors are located aft axial direction compared to the second turbine.

Aspect 15: The supersonic jet engine of any one of Aspects 13-14, wherein the first turbine rotates in a first direction and the second turbine rotates in a second direction that is contra to the first direction.

Aspect 16: The supersonic jet engine of any one of Aspects 1-15, wherein the spike is conical shaped.

Aspect 17: The supersonic jet engine of any one of Aspects 1-16, wherein the spike is movable.

Aspect 18: A supersonic jet engine system comprising: a source of hydrogen; a multi-stack fuel cell coupled to the source of hydrogen; an oxygen concentrator coupled to the multi-stack fuel cell; an electrical load management system coupled to the multi-stack fuel cell; a supersonic jet engine operable to receive electrical power from the electrical load management system, wherein the electrical power drives a plurality of electric motors that rotates a plurality of radial compressors of the supersonic jet engine and thereby rotate a plurality of fans within the supersonic jet engine.

Aspect 19: The supersonic jet engine system of Aspect 18, wherein the supersonic jet engine further includes one or more of Aspects 1-17.

What is claimed is:

1. A supersonic jet engine comprising:
   a housing having an inlet and an exhaust nozzle;
   a spike extending outwardly from the inlet;
   a plurality of fans arranged in an axial direction within the housing, wherein each of the plurality of fans includes a plurality of fan blades;
   a plurality of turbines, each of the plurality of turbines having a plurality of turbine blades and being arranged and coupled to a respective one of the plurality of fans in a radial direction;
   a plurality of radial compressors located radially from each of the plurality of turbines and operable to drivingly rotate the respective one of the plurality of turbines, which in turn rotates the respective fan;
   a plurality of electric motors, each of the plurality of electric motors coupled to a respective one of the plurality of radial compressors and drivingly rotating the respective radial compressor.

2. The supersonic jet engine of claim 1, wherein the spike is conical shaped.

3. The supersonic jet engine of claim 1, wherein the spike is movable.

4. The supersonic jet engine of claim 1, wherein the housing forms a plurality of ramp doors and a plurality of secondary flow channels that extend from a respective one of the plurality of ramp doors to a respective one of the plurality of radial compressors.

5. The supersonic jet engine of claim 4, wherein each of the plurality of ramp doors are configurable to adjust an intake area for the respective one of the secondary flow channels.

6. The supersonic jet engine of claim 4, further comprising a first set of stationary vanes that span from an interior of the housing to support a main shaft.

7. The supersonic jet engine of claim 4, wherein the respective one of the plurality of radial compressors is located at an exit end of a respective one of the plurality of secondary flow channels and air flows from the respective one of the plurality of secondary flow channels through the respective one of the radial compressors and then to a respective one of the plurality of turbines.

8. The supersonic jet engine of claim 7, wherein the plurality of turbines includes a first turbine and a second turbine and the plurality of radial compressors comprises a first set of radial compressors and a second set of radial compressors, wherein the first set of radial compressors are operable to rotate the first turbine and the second set of radial compressors are operable to rotate the second turbine.

9. The supersonic jet engine of claim 8, wherein the first set of radial compressors are located in a forward axial direction compared to the first turbine and the second set of radial compressors are located in an aft axial direction compared to the second turbine.

10. The supersonic jet engine of claim 8, wherein the first turbine rotates in a first direction and the second turbine rotates in a second direction that is contra to the first direction.

11. The supersonic jet engine of claim 1, wherein the exhaust nozzle is variable allowing the exhaust nozzle to adjust a size of an opening formed at an exit of the exhaust nozzle.

12. The supersonic jet engine of claim 1, further comprising a first spool of an axial compressor and a second spool of the axial compressor.

13. The supersonic jet engine of claim 12, wherein the first spool of axial compressor includes a plurality of axial compressor stages, and the second spool of axial compressor includes a plurality of axial compressor stages.

14. The supersonic jet engine of claim 12, wherein the first spool of axial compressor and the second spool of axial compressor rotate in contra direction.

15. The supersonic jet engine of claim 12, further comprising a plurality of stationary vanes located between a first fan and a second fan of the plurality of fans.

16. The supersonic jet engine of claim 12, further comprising a plurality of stationary vanes located between the first spool of the axial compressor and the second spool of the axial compressor.

17. The supersonic jet engine of claim 12, further comprising a plurality of stationary vanes located aft of the second spool of the axial compressor in an axial direction.

* * * * *